May 22, 1962  R. W. WILSON ETAL  3,035,645
SEMI-MOUNTED IMPLEMENT
Filed April 9, 1958  4 Sheets-Sheet 4
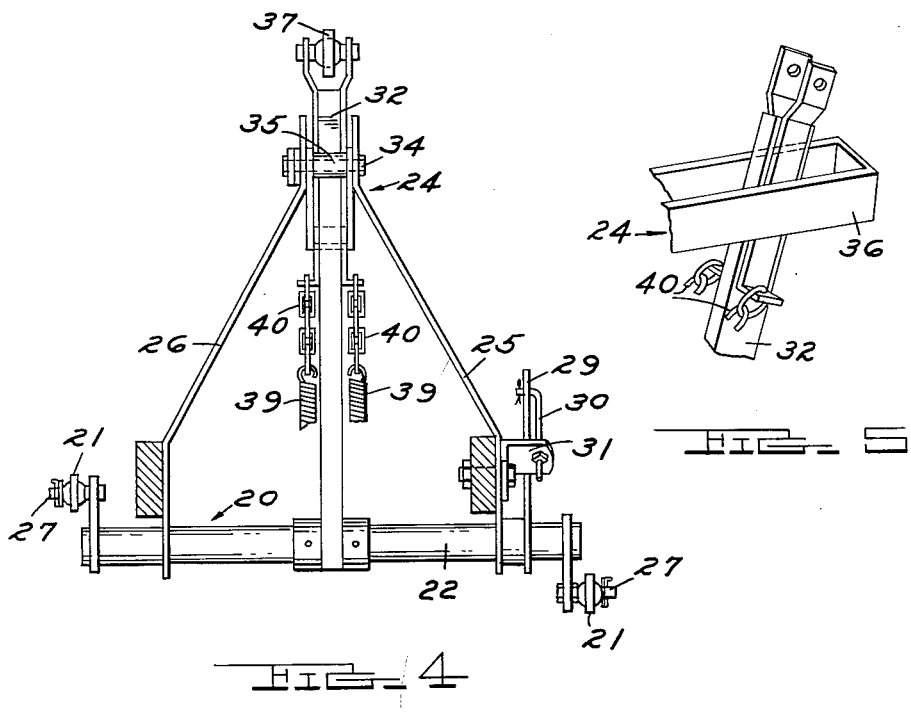
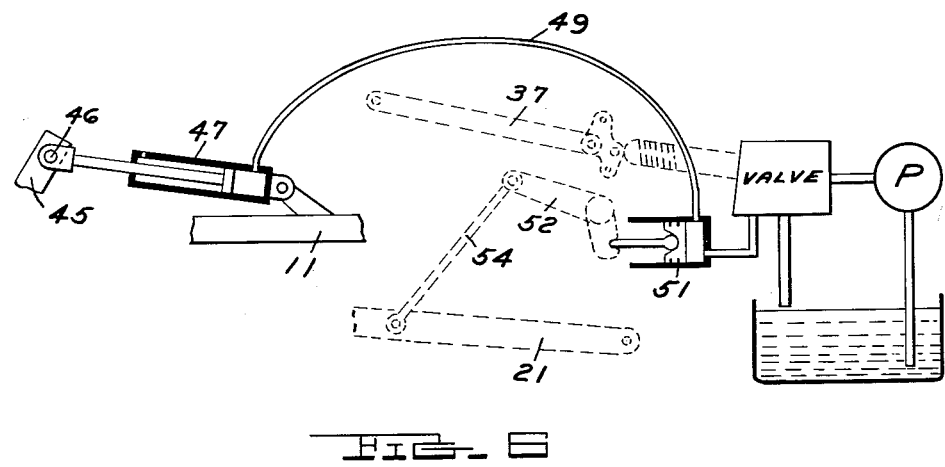
R. W. WILSON
T. W. CAHOW
E. C. McRAE
J. R. FAULKNER
P. F. HILDER
INVENTORS
BY
ATTORNEYS

United States Patent Office 3,035,645
Patented May 22, 1962

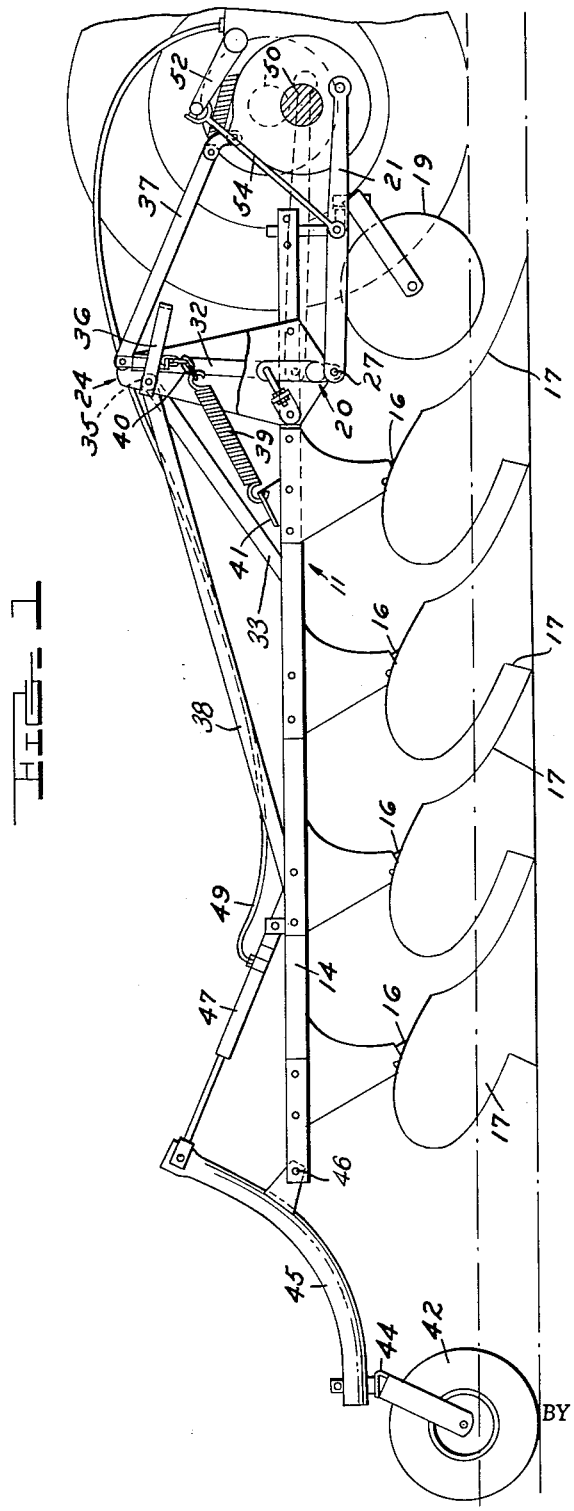

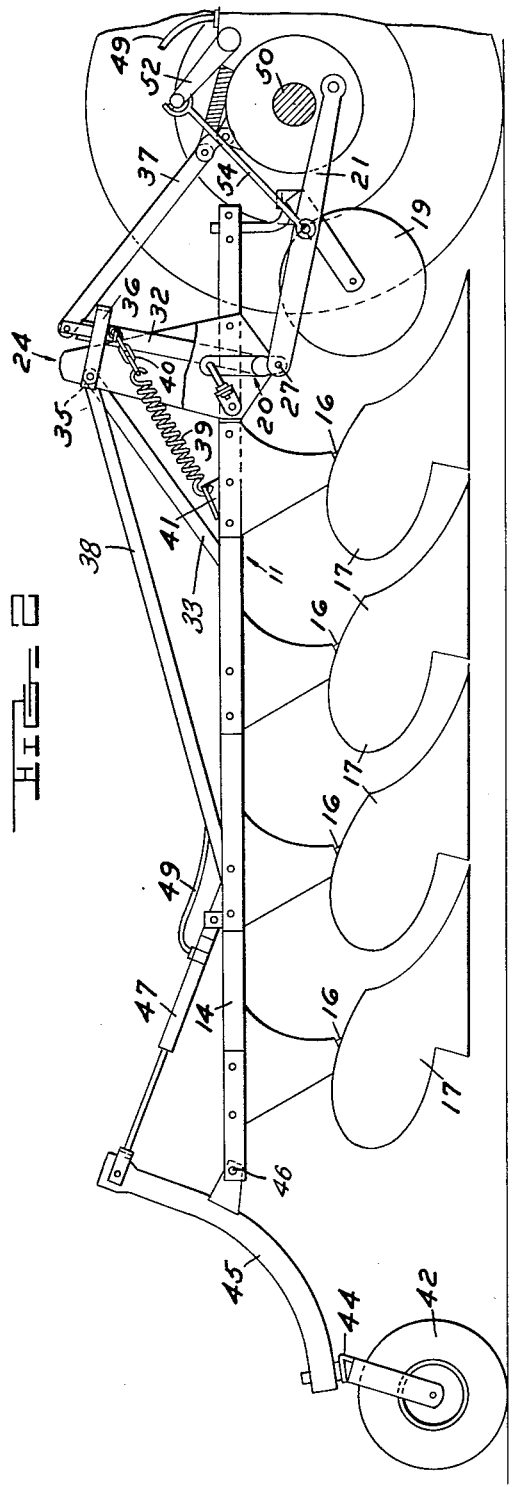

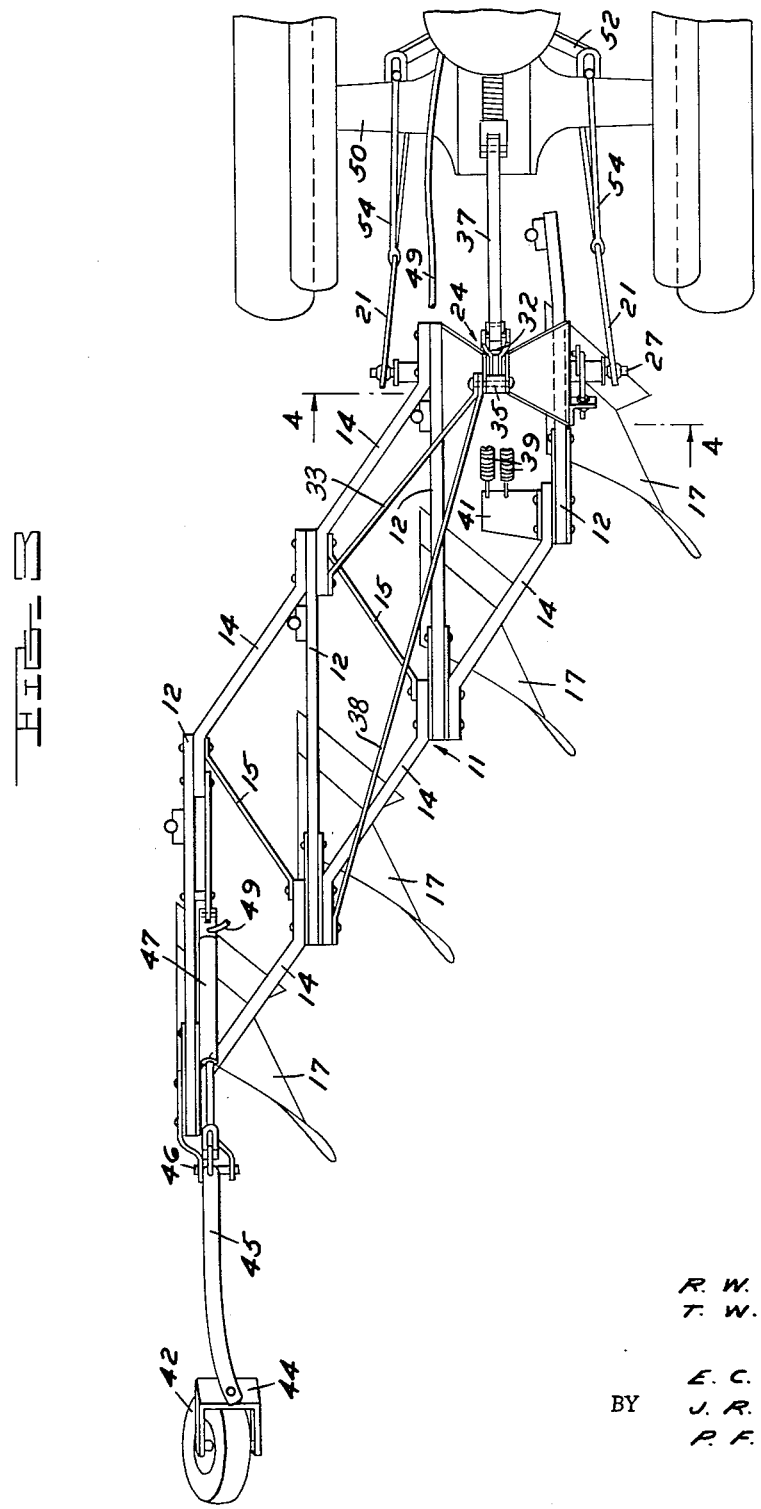

3,035,645
SEMI-MOUNTED IMPLEMENT
Raymond W. Wilson, Washington, and Theodore W. Cahow, Birmingham, Mich., assignors to Ford Motor Company, Dearborn, Mich., a corporation of Delaware
Filed Apr. 9, 1958, Ser. No. 727,298
9 Claims. (Cl. 172—445)

This invention relates to semi-mounted implements, and more particularly to a mechanism for lowering the transport wheel or wheels of such implements.

In the use of semi-mounted implements with tractors having a pair of liftable draft links for lifting the forward end of the implement, it is desirable to have a mechanism for lowering the tail or transport wheel in order to raise the rear of the implement when the front is raised. Particularly in the case of semi-mounted moldboard plows, it is desirable that the front of the plow be raised first and then the rear be raised so as to guide the plow upwardly out of the ground as it is moving forwardly. The present invention has particular utility when applied to semi-mounted plows, although the invention in its broader aspects is applicable to semi-mounted implements generally.

In the embodiment shown of the present invention, the transport wheel of a semi-mounted moldboard plow is controlled by a single acting hydraulic cylinder which is connected directly to the interior of the hydraulic lift cylinder built into the tractor so that the same pressure in the tractor lift cylinder is communicated to the cylinder controlling the transport wheel. The relative areas of the two cylinders and the mechanical advantage in the linkage operated by the cylinders is so chosen that upon actuating the tractor lift mechanism, the draft links will first be raised so as to lift the front end of the plow, after which the transport wheel will be forced downwardly to raise the rear end of the plow. In addition, means are provided to cause the weight of the plow to be transferred from the rear to the front end of the plow upon the front end raising somewhat, so as to lighten the load on the transport wheel and cause the transport wheel to commence to lift the rear of the plow before the draft links and forward portion of the plow have completely lifted. In the form shown of the present invention, this desirable result is achieved by a lever mounted on the plow which is moved relative to the plow upon lifting the draft links. One or more springs connected between the lever and the plow frame behind the lever are tensioned so as to transfer weight forwardly on the plow frame and lighten the load on the transport wheel to cause the rear of the plow to lift after the draft links and forward portion of the plow frame have lifted a predetermined distance.

Among the objects of the present invention are to provide a simplified and more economical mechanism for lifting a semi-mounted plow, to provide such a mechanism which is actuated directly from the tractor hydraulic system, at the same pressure, and without a separate control; to provide such a system which is simple and dependable in operation and which requires no adjustment; and to generally improve mechanisms of the type described.

Other objects and objects relating to details and economies of construction will be apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification in which:

FIGURE 1 is a somewhat diagrammatic side elevation of a semi-mounted plow according to the present invention applied to a tractor having a standard 3-point hitch, only the rear portion of the tractor being indicated and certain of the plow coulters being omitted.

FIGURE 2 is a view similar to FIGURE 1, showing the plow in raised position.

FIGURE 3 is a top plan view of the plow of FIGURES 1 and 2, the rear portion of the tractor being indicated.

FIGURE 4 is a vertical section of the plow frame and associated parts, taken generally along the line 4—4 of FIGURE 3.

FIGURE 5 is an enlarged detailed view of the upper end of the lever and its retainer for shifting the weight of the plow forwardly upon lifting the plow.

FIGURE 6 is a diagrammatic view of the hydraulic lift system of the tractor and plow.

Referring to the drawings, the present invention is embodied in a semi-mounted moldboard plow having a generally horizontal extending frame 11 formed of a series of laterally spaced plow beams 12 arranged in echelon and connected by a series of diagonal braces 14 and 15. A plow standard 16 extends downwardly from the rear end of each plow beam 12 and supports a plow bottom 17. Preferably, a disc-shaped coulter 19 is supported from the forward end of each plow beam 12, only one coulter being indicated in FIGURES 1 and 2 of the drawings and only the coulter standards being indicated in FIGURE 3. The plow frame, bottoms and coulters are more or less conventional.

The plow frame 11 is provided at its forward end with a transversely extending cross shaft 20 forming a transverse axis for pivotally receiving the rear ends of the draft links 21, 21 of a tractor having a standard 3-point hitch. The cross shaft 20, which is shown more specifically in FIGURE 4, consists of a straight shaft section 22 rotatably received in the lower portion of an A frame 24 formed by upwardly converging plates 25 and 26 secured to and forming a portion of the plow frame 11. The right end of the shaft section 22 has a downwardly offset journal 27 and the left end of the shaft has an upwardly offset journal 27, the journals 27, 27 pivotally receiving the rear ends of the draft links 21. The cross shaft construction is more or less conventional and permits the tractor to be operated with the draft links 21, 21 more or less at the same inclination even though the right wheels of the tractor are in the furrow bottom and the left wheels are riding on unplowed land, the plow remaining transversely level so that there is equal penetration by all of the bottoms. A lever 29, fixed to the shaft section 22 and held in adjustable position by a J bolt 30 received within an angle 31 secured to the plow frame 11, serves to adjust and hold the cross shaft 20 at various positions to adjust the width of cut of the plow bottoms 17, all in a well known manner.

A lever 32 is rotatably supported on the cross shaft 20 and projects upwardly at least as high as, and preferably slightly higher than, the top of the A frame 24, the plates 25 and 26 of the A frame preferably being united at their upper ends by a bolt 34 and spacer 35 maintaining a space between the plates which is somewhat greater than the thickness of the lever 32. Preferably, a U shaped retainer 36 (FIGURE 5) supported from the A frame 24 extends forwardly about the lever 32 to limit forward oscillation of the lever. The upper end of lever 32 is bifurcated to receive the top link 37 of the tractor, and the arrangement is such that while the plow is operating, the spacer 35 of the A frame will bear against the rear side of the lever to transmit compression to the top link for draft control of the plow, as will be explained. Braces 33 and 38 extend rearwardly and downwardly from the top of the A frame 24 to the plow frame 11. The upper portion of the lever 32 is connected to the plow frame 11 by resilient means, preferably a pair of tension springs 39, 39 extending between chains 40, 40 secured to the lever and a bracket 41 secured to the plow frame to the rear of the cross shaft 20. The arrangement is such that the springs 39, 39 are not tensioned when the lever is against the spacer 35 of the A frame, but become tensioned as the lever is rocked forwardly, transmitting a lifting force tending to rotate the rear of the plow frame upwardly about the cross shaft 20 as an axis and therefore transferring the weight of the plow forwardly along the frame 11.

A transport wheel 42 is rotatably supported in a fork 44 mounted on an arm or lever 45 supported on a transverse pivot 46 at the rear of the plow frame 11. The transport wheel 42 is free to caster and preferably lies in a plane parallel to the planes of the tractor wheels so as to be vertical during transport. During plowing, as indicated in FIGURE 3, the wheel lies in a somewhat inclined plane. The transport wheel arm 45 projects upwardly beyond the pivot 46, and a single acting hydraulic cylinder 47 extends between the upper end of the arm and the plow frame 11. A hydraulic hose 49 serves to connect the cylinder 47 with the hydraulic system of the tractor, as will be explained.

The previously described plow is particularly adapted for use with a tractor having a standard 3-point hitch, in which a pair of draft links 21, 21 are pivotally mounted on the rear axle housing 50 of the tractor. The draft links 21, 21 may be lifted by a hydraulic lift cylinder 51 built into the tractor and operating through lift arms 52, 52 and lift links 54, 54. A tractor of this type is shown in H. L. Brock Patent 2,624,257. The tractor hydraulic system described in that patent includes a draft control system in which the compressive force or thrust on the top link is utilized to actuate a hydraulic valve to admit hydraulic fluid to the lift cylinder of the tractor upon the tractor draft (and thus the thrust on the top link) exceeding a predetermined value, and to permit the draft links to drop whenever the thrust on the top link falls below a predetermined value, thus maintaining a more or less uniform draft of the plow during operation by lifting or lowering the plow. This system, which is embodied in the tractor shown in the drawings, is more particularly described in the above-mentioned patent.

The hydraulic hose 49 of the plow is connected directly with the lift cylinder 51 of the tractor so that the pressure within the cylinder 47 of the plow will at all times be equal to the pressure within the lift cylinder of the tractor. A connection to the tractor lift cylinder 51 may be provided on the top of the tractor case, as indicated in the drawings.

The relative cross sectional areas of the cylinders 47 and 51 and the mechanical advantage of the mechanism operated by such cylinders is such that when both cylinders are exposed to equal hydraulic pressure, the tractor lift cylinder 51 will operate first to lift the plow, and, except for the springs 39, 39, would move to the end of its travel without the plow cylinder 47 being operated. However, as the forward end of the plow frame 11 is lifted by the draft links 21, 21, the lever 32, the upper end of which engages the tractor top link 37, is rocked forwardly relative to the plow frame, thus tensioning the spring 39, 39, and transferring a portion of the weight of the plow forwardly from the rear to the front of the plow frame 11. Upon the load on the transport wheel 42 being lightened somewhat, the pressure within the hydraulic cylinder 47 of the plow will be sufficient to press the wheel downwardly, thus raising the rear end of the plow frame 11. By adjusting the amount of lost motion as the lever 32 swings forwardly away from the spacer 35 before the springs 39, 39 are tensioned, the amount of lift of the front of the plow before lifting of the rear commences can be regulated. The lag in lift in the rear of the plow permits the plow to be steered out of the ground during forward movement rather than lifting the plow while in horizontal position.

During plowing, the lever 32 is against the spacer 35 of the A frame, thereby transmitting compression to the tractor top link 37 and permitting the draft control mechanism of the tractor to operate in the normal manner. At this time the tension springs 39, 39 are not tensioned, and do not serve to transfer weight forwardly of the plow frame. The variations in pressure within the tractor lift cylinder 51 are transmitted to the cylinder 47, but are insufficient alone to raise the rear of the plow, or to substantially affect plowing action.

The implement lift mechanism of the present invention is not only simple and dependable, but provides a system which operates at a uniform pressure throughout and does not require additional valving or a differential pressure between the two cylinders. The invention can be applied to semi-mounted implements generally, whether or not draft control as in a plow is desired, and regardless of the amount of lag in lifting desired between the front and the rear of the implement.

We claim:

1. A semi-mounted implement for use with a tractor having a pair of spaced, rearwardly extending draft links and means, including a hydraulic cylinder, for raising the draft links; said implement having means on the forward portion thereof receiving the rear ends of the draft links and forming a transverse axis for the implement, at least one transport wheel at the rear of the implement mounted for raising and lowering movement, means including a hydraulic cylinder connected with the hydraulic cylinder of the tractor for forcing the transport wheel downwardly to raise the rear of the implement about the transverse axis at the forward portion thereof, means mounted on the forward portion of the implement, connected with the tractor and moved relative to the implement upon raising the draft links of the tractor, and resilient means connecting said mounted means with the implement and stressed upon raising the draft links, the stress of said resilient means serving to transfer weight from the rear to the forward portion of said implement.

2. A semi-mounted implement for use with a tractor having a pair of spaced, rearwardly extending draft links and means, including a hydraulic cylinder, for raising the draft links; said implement having means on the forward portion thereof receiving the rear ends of the draft links and forming a transverse axis for the implement, at least one transport wheel at the rear of the implement mounted for raising and lowering movement, means including a hydraulic cylinder connected with the hydraulic cylinder of the tractor for forcing the transport wheel downwardly to raise the rear of the implement about the transverse axis at the forward portion thereof, a lever mounted on the forward portion of the implement, connected with the tractor and moved relative to the implement upon raising the draft links of the tractor, and resilient means connecting the lever with the implement and stressed upon raising the draft links, the stress of said resilient means serving to transfer weight from the rear to the forward portion of said implement.

3. A semi-mounted implement for use with a tractor having a pair of spaced, rearwardly extending draft links and means, including a hydraulic cylinder, for raising the draft links; said implement having means on the forward portion thereof receiving the rear ends of the draft links, and forming a transverse axis for the implement, at least one castering wheel at the rear of the implement mounted for raising and lowering movement, means including a hydraulic cylinder connected with the hydraulic cylinder of the tractor for forcing the castering wheel downwardly to raise the rear of the implement about the transverse axis at the forward portion thereof, a lever mounted on the forward portion of the implement, connected with the tractor and moved relative to the implement upon raising the draft links of the tractor, and a spring connecting the lever with the implement and stressed upon raising the draft links, the stress of said spring serving to transfer weight from the rear to the forward portion of said implement.

4. For a tractor having a pair of spaced, rearwardly extending draft links and means, including a hydraulic cylinder, for raising the draft links; a semi-mounted implement comprising an implement frame, means on the forward portion of the frame pivotally receiving the rear ends of the draft links for rocking movement of the frame on a transverse axis, a transport wheel supported for raising and lowering movement on the rear portion of the frame, a hydraulic cylinder for forcing the wheel downwardly to raise the rear of the implement for transport, means for communicating the hydraulic pressure within the tractor hydraulic cylinder to the hydraulic cylinder of the implement, said hydraulic pressure being at all times insufficient alone to cause lifting of the rear of the implement, movable means mounted on the implement frame, connected with the tractor and moved relative to said frame upon raising the draft links of the tractor and spring means connected between the movable means and the frame and deformed responsive to lifting of the draft links for biasing the rear of the frame upwardly to lessen the weight on the transport wheel and cause the hydraulic cylinder to lift the rear of the implement.

5. In combination with a tractor having a 3-point hitch including a pair of spaced, rearwardly extending draft links, means, including a hydraulic cylinder, for lifting the draft links, a top link, and means responsive to compression in the top link for controlling the hydraulic system so as to prevent draft of an implement mounted on said links from exceeding a predetermined maximum; a semi-mounted soil working implement comprising a frame, means on the forward portion of the frame for pivotally receiving the rear ends of the draft links for rocking movement of the frame on a transverse axis, a lever mounted on the frame for swinging movement about a transverse axis and having its upper end pivotally connected to the top link of the tractor, the frame having an upward extension located immediately behind the upper portion of said lever, soil working elements mounted on said frame, transport wheel means supported for raising and lowering movement on the rear portion of the frame, a hydraulic cylinder extending between the frame and the transport wheel means for forcing the wheel downwardly to raise the rear of the implement for transport, and means for communicating the hydraulic pressure within the tractor hydraulic cylinder to the hydraulic cylinder of the implement, said hydraulic pressure being at all times insufficient alone to cause lifting of the rear of the implement, means extending between the lever and frame and stressed responsive to lifting of the draft links for lessening the weight on the transport wheel to cause the hydraulic cylinder to lift the rear of the implement, the extension of the frame being in contact with the lever when the implement is in lowered, soil working position to maintain compression within the top link for draft control.

6. In combination with a tractor having a 3-point hitch including a pair of spaced, rearwardly extending draft links, means, including a hydraulic cylinder, for lifting the draft links, a top link, and means responsive to compression in the top link for controlling the hydraulic system so as to prevent draft of an implement mounted on said links from exceeding a predetermined maximum; a semi-mounted soil working implement comprising a frame, means on the forward portion of the frame for pivotally receiving the rear ends of the draft links for rocking movement of the frame on a transverse axis, a lever mounted on the frame for swinging movement about a transverse axis and adapted to have its upper end pivotally connected to the top link of the tractor, the frame having an upward extension rigid with the frame and located immediately behind the upper portion of said lever, soil working elements mounted on said frame, transport wheel means supported on the rear of the frame for raising and lowering movement, a hydraulic cylinder extending between the frame and transport wheel means for forcing the wheel downwardly to raise the rear of the implement for transport, and means for communicating the hydraulic pressure within the tractor hydraulic cylinder to the hydraulic cylinder of the implement, said hydraulic pressure being at all times insufficient alone to cause lifting of the rear of the implement and a spring connected between the lever and frame and stressed responsive to lifting of the draft links to reduce the weight on the transport wheel and cause the hydraulic cylinder to lift the rear of the implement, the lever being rocked rearwardly relative to the upward extension of the frame upon lowering the implement to operative position whereby the extension is in contact with the lever when the implement is in lowered position to maintain compression within the top link for draft control.

7. A semi-mounted implement for attachment to a tractor, said implement comprising: a generally horizontal, rearwardly extending frame provided with a horizontal transverse axis at its forward end for connection with liftable draft links of a tractor, a tail wheel, a mounting supporting the tail wheel from the frame, a single acting hydraulic cylinder connected between the frame and the tail wheel mounting for forcing the wheel downwardly to raise the rear end of the frame, a hose for connecting the hydraulic cylinder with a source of hydraulic fluid under pressure, a lever mounted on the transverse axis including means for connecting the same to the tractor and adapted to be rotated relative to the frame upon lifting the forward end of the frame by means of the tractor draft links, and a spring extending between the lever and the frame and stressed by rotation of the lever to bias the rear end of the frame upwardly.

8. A semi-mounted implement for attachment to a tractor, said implement comprising: a generally horizontal, rearwardly extending frame provided with a horizontal transverse axis at its forward end for connection with liftable draft links of a tractor, a tail wheel, a mounting supporting the tail wheel from the frame, a single acting hydraulic cylinder connected between the frame and the tail wheel mounting for forcing the wheel downwardly to raise the rear end of the frame, a hose for connecting the hydraulic cylinder with a source of hydraulic fluid under pressure, a lever mounted on the frame adjacent the forward end thereof including means for connecting the same to the tractor and adapted to be rotated relative thereto upon lifting the forward end of the frame by means of the tractor draft links, and a spring extending between the lever and the frame and stressed by rotation of the lever to bias the rear end of the frame upwardly.

9. In combination with a tractor having a 3-point hitch including a pair of spaced, rearwardly extending draft links and a top link, and means, including a hydraulic cylinder, for lifting the draft links; a semi-mounted soil working implement comprising a frame, means on the forward portion of the frame for pivotally receiving the rear ends of the draft links for rocking movement of the frame on a transverse axis, a lever mounted on the frame for swinging movement about a transverse axis and adapted to have its upper end pivotally connected to the top link of the tractor, wheel means supported on the rear portion of the frame for raising and lowering movement, a hydraulic cylinder extending between the frame and transport wheel means for forcing the wheel downwardly to raise the rear of the implement for transport, and means for communicating the hydraulic pressure within the tractor hydraulic cylinder to the hydraulic cylinder of the implement, said hydraulic pressure being at all times insufficient alone to cause lifting of the rear of the implement, resilient means extending between the lever and frame and stressed responsive to lifting of the draft links from lessening the weight on the wheel means to cause the hydraulic cylinder to lift the rear of the implement.

References Cited in the file of this patent

UNITED STATES PATENTS

| | | |
|---|---|---|
| 2,247,534 | Von Schlegell | July 1, 1941 |
| 2,336,410 | McKay | Dec. 7, 1943 |
| 2,777,375 | Carlin et al. | Jan. 15, 1957 |
| 2,907,394 | Cook | Oct. 6, 1959 |
| 2,914,125 | Tanke et al. | Nov. 24, 1959 |
| 2,968,356 | Mydles | Jan. 17, 1961 |

FOREIGN PATENTS

| | | |
|---|---|---|
| 1,002,550 | Germany | Feb. 14, 1957 |
| 665,140 | Great Britain | Jan. 16, 1952 |